United States Patent [19]
Fitzpatrick et al.

[11] Patent Number: 5,392,387
[45] Date of Patent: Feb. 21, 1995

[54] METHOD AND SYSTEM FOR ENHANCED DATA ACCESS EFFICIENCY IN AN ELECTRONIC BOOK

[75] Inventors: Gregory P. Fitzpatrick, Fort Worth; Thomas R. Haynes, Euless, both of Tex.

[73] Assignee: International Business Machines Corporation, Armonk, N.Y.

[21] Appl. No.: 992,374

[22] Filed: Dec. 17, 1992

[51] Int. Cl.[6] .............................................. G06F 15/62
[52] U.S. Cl. .................................... 395/156; 395/159
[58] Field of Search ............... 395/144, 145, 146, 147, 395/148, 149, 150, 151, 152, 153, 154, 155, 156, 157, 158, 159, 160, 161

[56] References Cited
U.S. PATENT DOCUMENTS

| | | | |
|---|---|---|---|
| 5,140,678 | 8/1992 | Torres | 395/159 |
| 5,283,864 | 2/1994 | Knowlton | 395/158 |

*Primary Examiner*—Mark K. Zimmerman
*Assistant Examiner*—Joseph R. Burwell
*Attorney, Agent, or Firm*—David A. Mims; Andrew J. Dillon

[57] ABSTRACT

A method and system for enhanced data access efficiency in an electronic book implemented within a data processing system having a display, at least one displayable index screen which includes multiple selectable topics and multiple numbered data pages. A user is permitted to designate particular selectable topics within the index screen and page tabs are then displayed for each numbered data page which includes a reference to a designated selectable topic. An iconic representation of the index screen is displayed in the absence of a display of the index screen. The iconic representation of the index screen includes a selectable control element. Each time the selectable control element is selected by a user, a list of each designated selectable topic is provided. A listing of page tabs for each numbered data page associated with a listed selectable topic is then displayed each time a listed selectable topic is graphically selected by a user. Particular data pages may then be selected directly, by graphically designating page tabs, without requiring the display of an index screen.

11 Claims, 4 Drawing Sheets

METHOD AND SYSTEM FOR ENHANCED DATA ACCESS EFFICIENCY IN AN ELECTRONIC BOOK

BACKGROUND OF THE INVENTION

1. Technical Field

The present invention relates in general to an improved data processing system and in particular to a method and system for enhanced data access efficiency in a data processing system. Still more particularly, the present invention relates to an improved method and system for enhanced data access efficiency in an electronic book implemented within a data processing system.

2. Description of the Related Art

Computers and computer based information systems are rapidly supplanting more traditional forms of data and information transfer. Electronic mail systems are now quite prevalent as managers and administrators seek to minimize the amount of so-called "float" present in traditional paper mail systems. A natural extension of electronic mail systems is the so-called "electronic book" which simulates electronically a physical book. Electronic books may be implemented utilizing a standard personal computer or a small portable specialized device which often includes a provision for providing two pages of display in a hinged, book-like manner.

As with physical books, electronic books typically include a plurality of numbered pages and an index which may be utilized to access selected pages which include a reference to a selected topic listed within the index. Graphic designation of a selected topic within an electronic book index generally results in the display of multiple page tabs, which are graphic indications of those pages within the electronic book which contain a reference to the selected topic. Graphic designation of a page tab utilizing a graphic pointing device, such as a mouse, will generally result in a display of the associated page.

While systems such as those described above are fairly efficient in permitting a user to select and access data pages within an electronic book, each access requires the user to display the index page and its associated page tabs in order to directly access a selected data page. It should therefore be apparent that a need exists for a method and system which permits a user to rapidly and efficiently access data pages within an electronic book which are associated with particular topics listed within the index, without requiring a display of the index page.

SUMMARY OF THE INVENTION

It is therefore one object of the present invention to provide an improved data processing system.

It is another object of the present invention to provide an improved method and system for enhanced data access efficiency in a data processing system.

It is yet another object of the present invention to provide an improved method and system for enhanced data access efficiency in an electronic book implemented within a data processing system.

The foregoing objects are achieved as is now described. A method and system are disclosed for enhanced data access efficiency in an electronic book implemented within a data processing system having a display, at least one displayable index screen which includes multiple selectable topics and multiple numbered data pages. A user is permitted to designate particular selectable topics within the index screen and page tabs are then displayed for each numbered data page which includes a reference to a designated selectable topic. An iconic representation of the index screen is displayed in the absence of a display of the index screen. The iconic representation of the index screen includes a selectable control element. Each time the selectable control element is selected by a user, a list of each designated selectable topic is provided. A listing of page tabs for each numbered data page associated with a listed selectable topic is then displayed each time a listed selectable topic is graphically selected by a user. Particular data pages may then be selected directly, by graphically designating page tabs, without requiring the display of an index screen.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
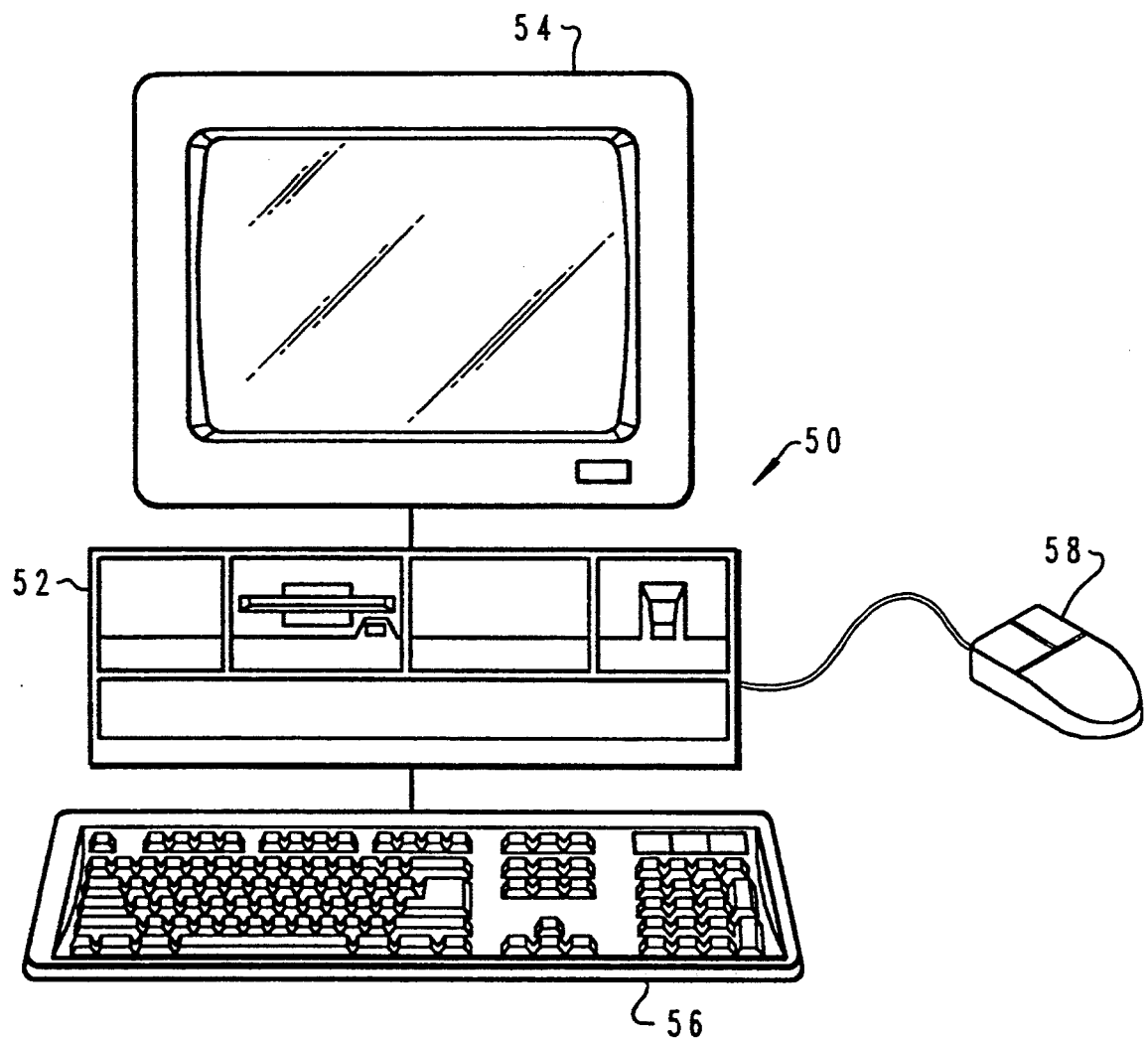
FIG. 1 is a pictorial representation of a data processing system which may be utilized to implement the method and system of the present invention.

With reference now to the figures and in particular with reference to FIG. 1, there is depicted a pictorial illustration of a data processing system 50 which may be utilized to implement a preferred embodiment of the method and system of the present invention. Data processing system 50 includes a system unit 52, a video display terminal 54, a keyboard 56 and a mouse device 58. Data processing system 50 may be implemented utilizing any suitable computer, such as an IBM PS/2 computer, a product of International Business Machines Corporation, located in Armonk, N.Y. "PS/2" is a registered trademark of International Business Machines Corporation.

Although the depicted embodiment of the present invention is implemented within a personal computer, a preferred embodiment of the present invention may be implemented in other types of data processing systems, such as for example, intelligent workstations, mini computers or specialized portable devices which are specifically designed to implement electronic books. In the depicted embodiment of the present invention data processing system 50 is preferably suitably programmed to provide the displays depicted within FIGS. 2-5 and to implement the process set forth within the flowchart of FIG. 6.

Figure 2:
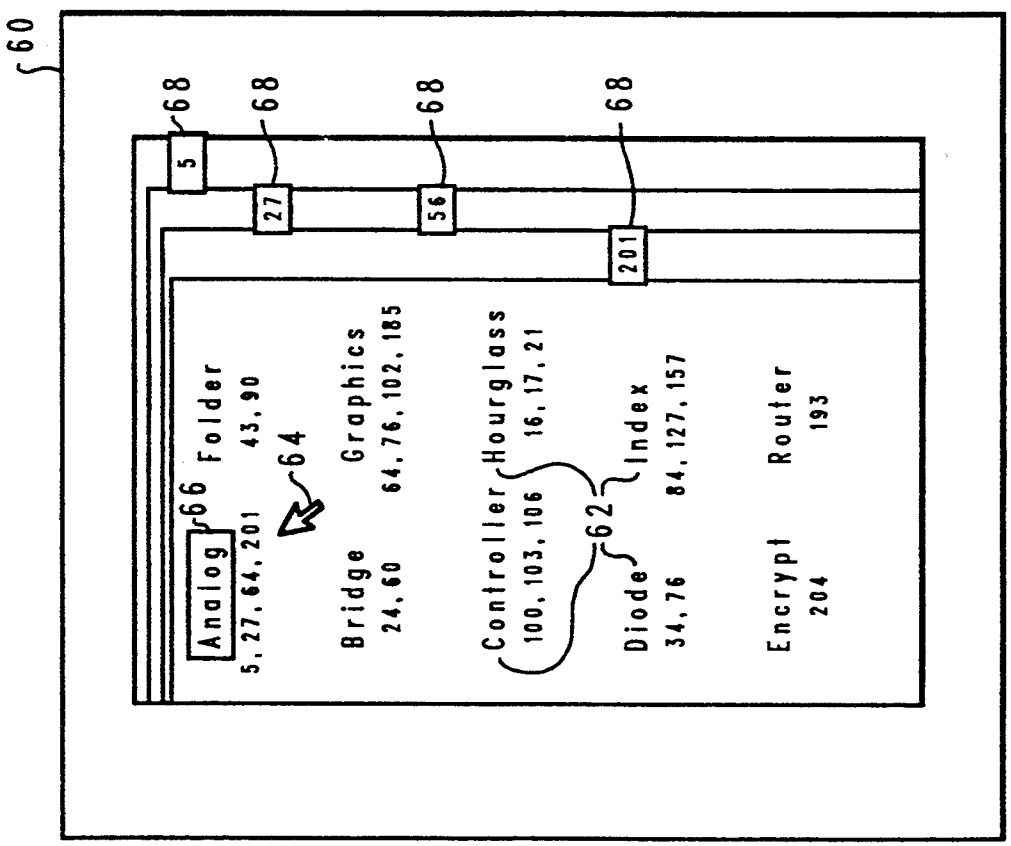
FIG. 2 is a pictorial representation of an index screen having a single selected topic which may be utilized with the method and system of the present invention.

Referring now to FIG. 2, there is depicted a pictorial representation of an index screen 60 which may be utilized with the method and system of the present invention. As depicted, index screen 60 preferably graphically illustrates a traditional index which sets forth multiple selectable topics 62, which may be designated by a user. In the depicted embodiment of the present invention each selectable topic may be graphically designated by a user utilizing a mouse pointer 64. Once graphically selected, a particular selectable topic will be graphically indicated as selected by highlighting that topic, utilizing reverse video, or graphically depicting in some manner the selected status of a particular topic.

As depicted, the designation of a selectable topic within index screen 60 will result in the generation and display of multiple page tabs 68. Each page tab 68 thus depicted indicates the number of an associated data page which includes a reference to the selected topic within index screen 60. Thus, as depicted in FIG. 2, the selection of the topic "Analog" results in the generation of four page tabs 68, which each indicates an associated data page which includes a reference to the topic "Analog."

Figure 3:
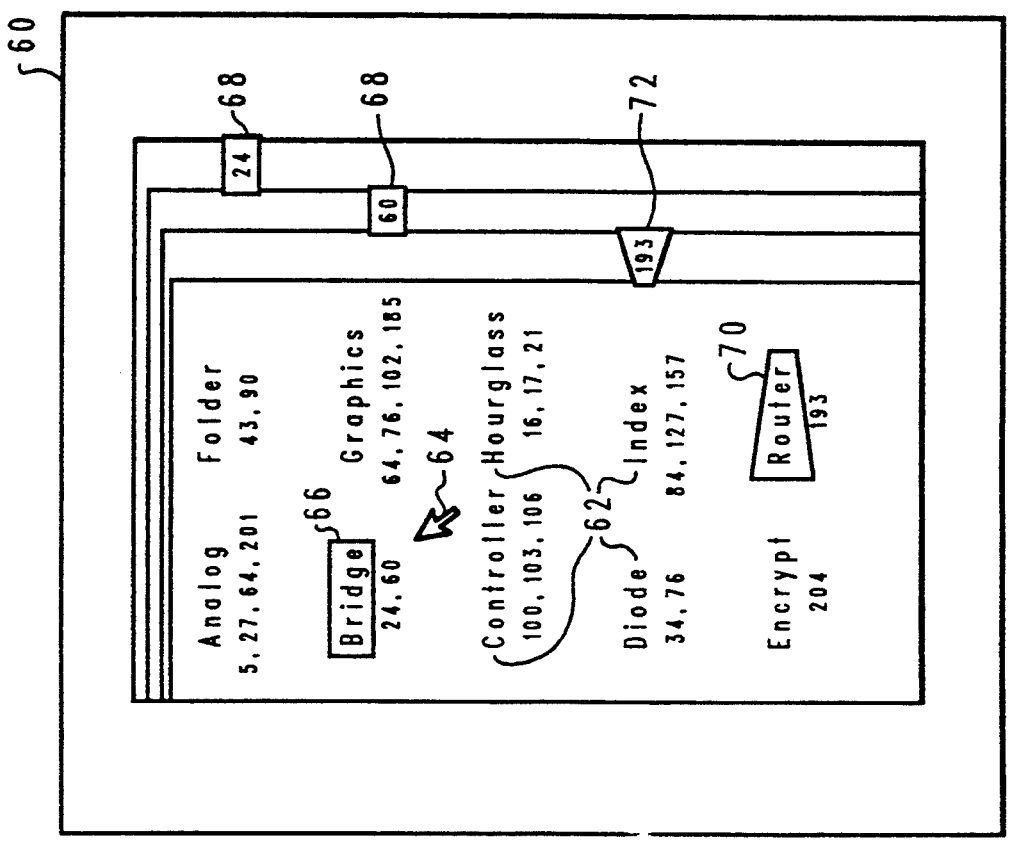
FIG. 3 is a pictorial representation of an index screen having multiple selected topics which may be utilized with the method and system of the present invention.

With reference now to FIG. 3, there is depicted a pictorial representation of an index screen 60 having multiple selected topics. As illustrated within FIG. 3, the user has utilized mouse pointer 64 to designate topic 66 and topic 70. A slightly different graphic indication of this designation has been utilized to permit a correlation between each designated topic and those page tabs associated with that particular topic. Thus, it may be seen that page tabs 68 are associated with designated topic 66 while page tab 72 is associated with designated topic 70. Those skilled in the art will appreciate that this may also be accomplished utilizing color or other visually detectable means for distinguishing those page tabs associated with selected topics which have been designated by a user.

Figure 4:
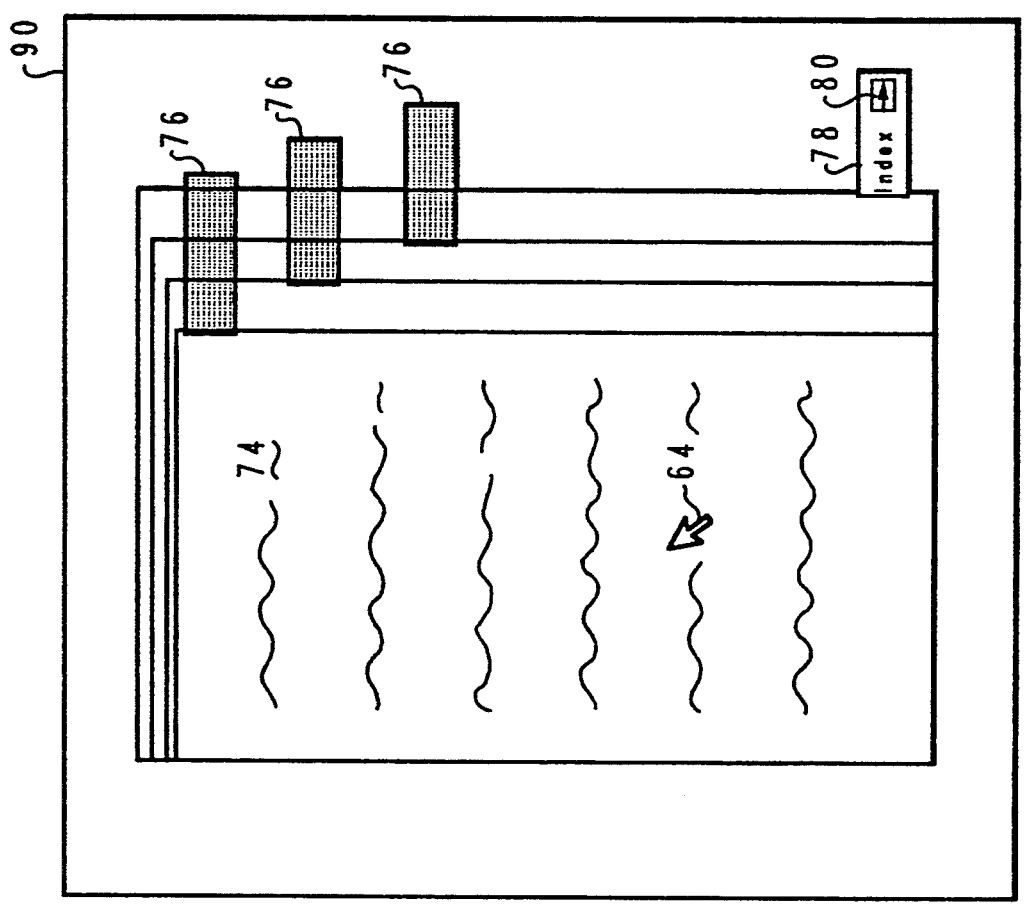
FIG. 4 is a pictorial representation of a data page which may be utilized with the method and system of the present invention.

Referring now to FIG. 4 there is depicted a pictorial representation of a data page screen 90 which visually depicts a numbered data page 74. Also depicted within FIG. 4 are multiple chapter tabs 76 and an index tab 78. Those skilled in the art will appreciate that the first data page contained within a particular chapter may be accessed by selecting a chapter tab 76 or alternately, an index screen may be displayed by selecting index tab 78, in a manner well known in the art.

In accordance with an important feature of the present invention, index tab 78 preferably includes an additional control element 80. The presence of control element 80, in accordance with the depicted embodiment of the present invention, indicates to the user that multiple topics within the index have been and remain designated by the user in the manner described with respect to FIGS. 2 and 3. Thereafter, in a manner which will be explained in greater detail herein, the graphic selection of control element 80 utilizing mouse pointer 64 may be utilized to display one or more submenus, which may be utilized to directly access particular data pages associated with a selected topic, without requiring the display of index screen 60. Of course, a graphic designation may be provided in conjunction with control element 80 to indicate the presence or absence of such submenus. For example, the box surrounding the arrow within control element 80 may be deleted if no topics are present with the index which have been previously designated by a user.

Figure 5:
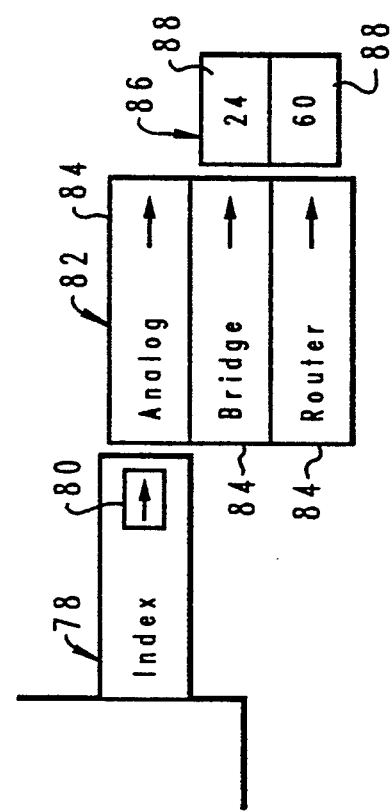
FIG. 5 is an enlarged view of an enhanced index tab which may be utilized with the method and system of the present invention.

With reference now to FIG. 5, there is depicted an enlarged view of index tab 78 which depicts the novel control element of the present invention. As illustrated, selection of control element 80, utilizing mouse pointer 64, by a user will result in the display of topic submenu 82. Listed within topic submenu 82 are multiple selected topics 84. In this manner, those topics within the index screen which have previously been designated by a user may be listed textually within a topic submenu, without requiring the user to initiate the display of index screen 60. Additionally, graphic selection of a particular topic, such as "Bridge," will result in the display of a page submenu 86. Page submenu 86 includes a listing of each page number which includes a reference to a selected designated topic, which has been selected from topic submenu 82. Thereafter, graphic designation of a page number within page submenu 86 will result in the direct accessing of a particular data page which includes a reference to a designated topic, without requiring the display of the index screen.

In this manner, as those skilled in the art will appreciate, a user may designate multiple topics within an index screen which are of interest and thereafter subsequently recall those page numbers having a reference to the designated topics by utilizing control element 80, without requiring the display of index screen 60. Of course, in the event only a single topic has been designated within index screen 60, a selection of control element 80 by a user utilizing mouse pointer 64 will preferably result in the immediate display of topic submenu 82 and page submenu 86, since only one listing of relevant page numbers will be necessary.

Figure 6:
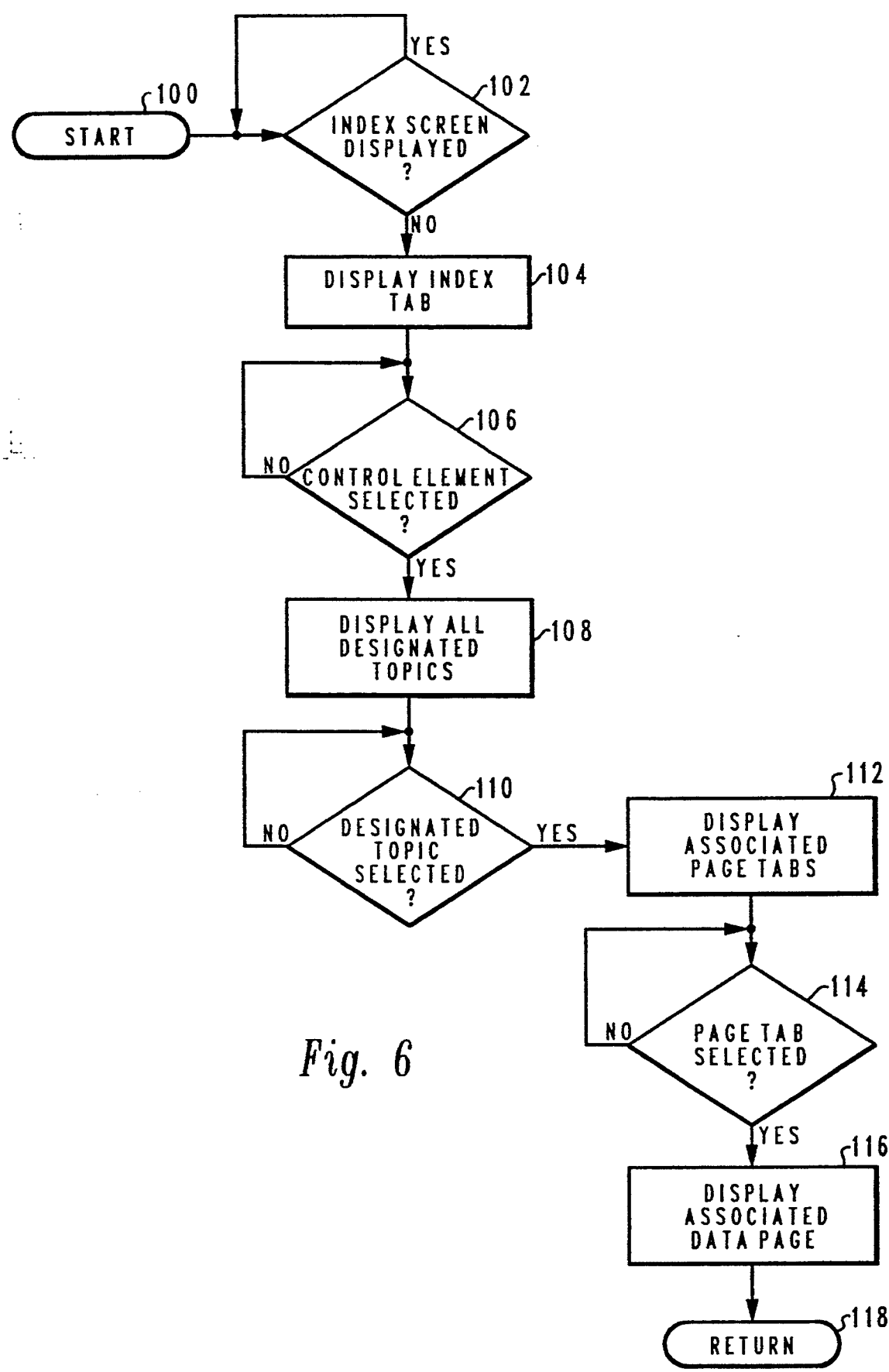
FIG. 6 is a high level logic flowchart illustrating a process for implementing the method and system of the present invention.

With reference now to FIG. 6, there is depicted a high level logic flowchart which illustrates a process for implementing the method and system of the present invention. As illustrated, this process begins at block 100 and thereafter passes to block 102. Block 102 illustrates a determination of whether or not index screen 60 is currently displayed, if so, the process merely waits until such time as index screen 60 is no longer displayed. Once index screen 60 is no longer displayed, as determined at block 102, the process passes to block 104. Block 104 illustrates the displaying of index tab 78, as depicted within FIGS. 4 and 5.

Next, the process passes to block 106. Block 106 illustrates a determination of whether or not control element 80 (see FIG. 5) has been selected. If not, the process merely waits until such time as control element 80 is selected. Once control element 80 has been selected, as determined at block 106, the process passes to block 108. Block 108 illustrates the display of all selected topics within a topic submenu, such as topic submenu 82.

Next, the process passes to block 110. Block 110 illustrates a determination of whether or not a listed topic within a topic submenu has been selected. If not, the process merely waits until such time as a topic has been selected. Once a topic within the topic submenu list has been selected, as determined at block 110, the process passes to block 112. Block 112 illustrates the displaying of the associated page tabs which contain a reference to the selected topic listed within topic submenu 82. Thereafter, the process passes to block 114. Block 114 illustrates a determination of whether or not a particular page tab has been selected and if not, the process merely waits until such time as a page tab has been selected. Once a page tab has been selected, as determined at block 114, the process passes to block 116. Block 116 illustrates the display of an associated data page which is indicated by the selected page tab. Thereafter, the process passes to block 118 and returns. Of course, those skilled in the art will appreciate that at any point during this process the user may "escape" from the process and return to normal operation by selection of an appropriate key sequence.

Upon reference to the foregoing those skilled in the art will appreciate that the Applicants herein have provided an efficient method and system whereby particular numbered data pages associated with a particular selected topic within an electronic book may be directly and efficiently accessed without the necessity of displaying an index screen and returning to that index screen each time a subsequent data page which includes a reference to the selected topic is desired.

While the invention has been particularly shown and described with reference to a preferred embodiment, it will be understood by those skilled in the art that various changes in form and detail may be made therein without departing from the spirit and scope of the invention.

We claim:

1. A method for enhanced data access efficiency in an electronic book having a display, at least one displayable index screen which includes multiple selectable textual topics and a listing of a plurality of numbered displayable data pages which include a reference to selected ones of said multiple selectable textual topics, said method comprising the steps of:

designating at least one of said multiple selectable textual topics within said displayable index screen in response to a selection thereof by a user during display of said index screen;

displaying an iconic representation of said index screen in the absence of a display of said index screen, said iconic representation including a control element therein;

displaying a list of each designated selectable textual topic within said displayable index screen in response to a selection of said control element by a user;

displaying a selectable graphic indication of each numbered displayable data page which includes a reference to a particular designated selectable textual topic in response to a selection of said particular designated selectable textual topic within said displayed list by a user; and displaying a particular numbered displayable data page in response to a selection of a selectable graphic indication associated therewith by a user wherein said selected displayable data page may be accessed without displaying said index screen.

2. The method for enhanced data access efficiency in an electronic book according to claim 1, further including the step of displaying within said index screen a selectable graphic indication of each numbered displayable data page which includes a reference to a designated selectable textual topic in response to said designation thereof.

3. The method for enhanced data access efficiency in an electronic book according to claim 2, wherein said step of displaying within said index screen a selectable graphic indication of each numbered displayable data page which includes a reference to a designated selectable textual topic in response to said designation thereof comprises the step of displaying within said index screen a page tab indication of each numbered displayable data page which includes a reference to a designated selectable textual topic in response to said designation thereof.

4. The method for enhanced data access efficiency in an electronic book according to claim 1, wherein said electronic book includes a graphic pointing device and wherein said step of designating at least one of said multiple selectable textual topics within said displayable index screen in response to a selection thereof by a user during display of said index screen comprises the step of designating at least one of said multiple selectable textual topics within said displayable index screen in response to a selection thereof by a user utilizing said graphic pointing device during display of said index screen.

5. The method for enhanced data access efficiency in an electronic book according to claim 4, wherein said step of displaying a list of each designated selectable textual topic within said displayable index screen in response to a selection of said control element by a user comprises the step of displaying a list of each designated selectable textual topic in response to a selection of said control element by a user utilizing said graphic pointing device.

6. A system for enhanced data access efficiency in an electronic book having a display, at least one displayable index screen which includes multiple selectable textual topics and a listing of a plurality of numbered displayable data pages which include a reference to selected ones of said multiple selectable textual topics, said system comprising:

means for designating at least one of said multiple selectable textual topics within said displayable index screen in response to a selection thereof by a user during display of said index screen;

means for displaying an iconic representation of said index screen in the absence of a display of said index screen, said iconic representation including a control element therein;

means for displaying a list of each designated selectable textual topic within said displayable index screen in response to a selection of said control element by a user;

means for displaying a selectable graphic indication of each numbered displayable data page which includes a reference to a particular designated selectable textual topic in response to a selection of said particular designated selectable textual topic within said displayed list by a user; and means for displaying a particular numbered displayable data page in response to a selection of a selectable graphic indication associated therewith by a user wherein said selected displayable data page may be accessed without displaying said index screen.

7. The system for enhanced data access efficiency in an electronic book according to claim 6, further including means for displaying within said index screen a selectable graphic indication of each numbered displayable data page which includes a reference to a designated selectable textual topic in response to said designation thereof.

8. The system for enhanced data access efficiency in an electronic book according to claim 7, wherein said means for displaying within said index screen a selectable graphic indication of each numbered displayable data page which includes a reference to a designated selectable textual topic in response to said designation thereof comprises means for displaying within said index screen a page tab indication of each numbered displayable data page which includes a reference to a designated selectable textual topic in response to said designation thereof.

9. The system for enhanced data access efficiency in an electronic book according to claim 6, further including a graphic pointing device.

10. The system for enhanced data access efficiency in an electronic book according to claim 9, wherein said means for designating at least one of said multiple selectable textual topics within said displayable index screen in response to a selection thereof by a user during display of said index screen comprises means for designating at least one of said multiple selectable textual topics within said displayable index screen in response to a selection thereof by a user utilizing said graphic pointing device during display of said index screen.

11. The system for enhanced data access efficiency in an electronic book according to claim 9, wherein said means for displaying a list of each designated selectable textual topic within said displayable index screen in response to a selection of said control element by a user comprises means for displaying a list of each designated selectable textual topic in response to a selection of said control element by a user utilizing said graphic pointing device.

* * * * *